(12) United States Patent
Wakabayashi et al.

(10) Patent No.: US 8,967,354 B2
(45) Date of Patent: Mar. 3, 2015

(54) CLUTCH COVER ASSEMBLY

(75) Inventors: Hirokazu Wakabayashi, Katano (JP); Norihiko Tanigawa, Suzuka (JP); Nobuhiko Matsumoto, Neyagawa (JP)

(73) Assignee: EXEDY Corporation, Osaka (JP)

( * ) Notice: Subject to any disclaimer, the term of this patent is extended or adjusted under 35 U.S.C. 154(b) by 161 days.

(21) Appl. No.: 13/805,066

(22) PCT Filed: Jun. 9, 2011

(86) PCT No.: PCT/JP2011/063282
§ 371 (c)(1),
(2), (4) Date: Dec. 18, 2012

(87) PCT Pub. No.: WO2012/005078
PCT Pub. Date: Jan. 12, 2012

(65) Prior Publication Data
US 2013/0092500 A1    Apr. 18, 2013

(30) Foreign Application Priority Data

Jul. 6, 2010  (JP) ................................. 2010-153630

(51) Int. Cl.
*F16D 13/75*  (2006.01)
*F16D 13/70*  (2006.01)

(52) U.S. Cl.
CPC ............. *F16D 13/70* (2013.01); *F16D 13/757* (2013.01)
USPC .................................. 192/70.252; 192/111.2

(58) Field of Classification Search
CPC .................................................... F16D 13/757
USPC ................. 192/111.18, 111.19, 111.2, 111.3, 192/111.4
See application file for complete search history.

(56) References Cited

U.S. PATENT DOCUMENTS

| 4,207,972 | A  | * | 6/1980  | Zeidler ..................... 192/70.252 |
| 5,069,322 | A  | * | 12/1991 | Mizukami et al. ......... 192/111.2 |
| 6,123,180 | A  | * | 9/2000  | Weidinger ............... 192/70.252 |
| 2013/0168200 | A1 | * | 7/2013 | Wakabayashi et al. .... 192/30 W |

FOREIGN PATENT DOCUMENTS

| EP | 1657463 A1 | 5/2006 |
| JP | H03-53628 U | 5/1991 |
| JP | 2000-002267 A | 1/2000 |
| JP | 2006-144819 A | 6/2006 |

OTHER PUBLICATIONS

Chinese Office Action of the corresponding Chinese Patent Application No. 201180029773.7, dated Sep. 2, 2014.

* cited by examiner

*Primary Examiner* — Richard Lorence
(74) *Attorney, Agent, or Firm* — Global IP Counselors, LLP

(57) ABSTRACT

In a clutch cover assembly, accurate abrasion compensation is constantly enabled by stabilizing the actuation of an abrasion amount detecting mechanism. The present clutch cover assembly includes a clutch cover fixed to a flywheel, a pressure plate, a diaphragm spring, an abrasion amount detecting mechanism and an abrasion tracking mechanism. The abrasion amount detecting mechanism is a mechanism having a plurality of meshing positions and includes a mobile detecting member configured to release meshing in a first meshing position and move to a second meshing position when the abrasion amount of a friction member reaches a predetermined amount. The abrasion tracking mechanism moves the diaphragm spring to an initial posture side thereof in accordance with the displacement of the mobile detecting member.

6 Claims, 7 Drawing Sheets

US 8,967,354 B2

CLUTCH COVER ASSEMBLY

CROSS-REFERENCE TO RELATED APPLICATIONS

This application claims priority to Japanese Patent Application No. 2010-153630 filed on Jul. 6, 2010. The entire disclosure of Japanese Patent Application No. 2010-153630 is hereby incorporated herein by reference.

TECHNICAL FIELD

The present invention relates to a clutch cover assembly, and particularly to a clutch cover assembly for pressing a friction member of a clutch disc assembly onto a flywheel of an engine and for releasing the pressing.

BACKGROUND ART

In general, a clutch cover assembly is attached to a flywheel of an engine and is used for transmitting the driving force of the engine towards a transmission. Such a clutch cover assembly mainly includes a clutch cover, a pressure plate and a diaphragm spring. The clutch cover is fixed to the flywheel. The pressure plate is pressed towards the flywheel by the diaphragm spring, and holds a friction member of the clutch disc assembly together with the flywheel while interposing the friction member therebetween. The diaphragm spring has a function of pressing the pressure plate, and also has a lever function of releasing the pressure onto the pressure plate.

When the abrasion of the friction member of the clutch disc assembly herein progresses due to the load characteristic of the diaphragm spring, the pressure load onto the friction member is increased. Therefore, when the friction member is abraded, a large load is required for executing a release operation and a clutch pedal tread force is inevitably increased.

In view of the above, as described in Patent Literature 1, for instance, an abrasion compensating mechanism has been provided that is designed to inhibit increase in pressing load by returning the posture of the diaphragm spring to its initial state even when the friction member is abraded. The abrasion compensating mechanism mainly includes: a fulcrum ring disposed between a pressure plate and a diaphragm spring; an urging mechanism that urges the fulcrum ring in a direction away from the pressure plate; and an abrasion amount detecting mechanism that detects the abrasion amount of the friction member. Here, the diaphragm spring presses the pressure plate through the fulcrum ring. Then, the diaphragm spring is kept at its initially set posture by moving the fulcrum ring to a side away from the pressure plate in accordance with the abrasion amount of the friction member.

On the other hand, an abrasion compensating mechanism described in Patent Literature 2 has been provided for improving instability attributed to vibration in actuating an abrasion amount detecting mechanism. Here, stability in actuation for abrasion compensation is designed by providing a cone spring in the abrasion amount detecting mechanism.

CITATION LIST

Patent Literature

PTL 1: Japan Laid-open Patent Application Publication No. JP-A-H10-227317
PTL 2: Japan Laid-open Patent Application Publication No. JP-A-2003-28193

SUMMARY

Technical Problems

It is important for the abrasion compensating mechanism as described above to accurately detect the abrasion amount. In Patent Literatures 1 and 2, the abrasion amount detecting mechanism is formed by a bushing and a bolt penetrating through the bushing, and the abrasion amount is configured to be detected based on a clearance to be produced therebetween in accordance with abrasion.

However, in the conventional structures as described above, there are chances that the clearance indicating the abrasion amount varies due to vibrations of respective elements in response to engine vibration and etc. It is thereby difficult to stably execute accurate abrasion compensation.

It is an object of the present invention to stabilize the actuation of an abrasion amount detecting mechanism for constantly executing accurate abrasion compensation.

Solution to Problems

A clutch cover assembly according to a first invention is an assembly for applying and releasing pressing of a friction member of a clutch disc assembly onto a flywheel of an engine, and includes a clutch cover fixed to the flywheel, a pressure plate, a pressure member, an abrasion amount detecting mechanism and an abrasion tracking mechanism. The pressure plate is coupled to the clutch cover in a relatively non-rotatable state and presses the friction member onto the flywheel. The pressure member is a member that is supported by the clutch cover and serves to press the pressure plate towards the flywheel. The abrasion amount detecting mechanism is a mechanism having a plurality of meshing positions and includes a mobile detecting member configured to release meshing in a first meshing position and move to a second meshing position when an abrasion amount of the friction member reaches a predetermined amount. The abrasion tracking mechanism moves the pressure member to an initial posture side thereof in accordance with a displacement of the mobile detecting member.

In the clutch cover assembly, the abrasion amount of the friction member is detected by the abrasion amount detecting mechanism. The plural meshing positions are set for the abrasion amount detecting mechanism, and when the friction member is abraded at the predetermined amount, the mobile detecting member is moved to the second meshing position from the first meshing position where it has been meshed so far. Therefore, a once detected abrasion amount, i.e., an abrasion amount detection result is kept unless meshing is released. Therefore, actuation is stabilized and accurate abrasion compensation can be executed, compared to a conventional mechanism for detecting the abrasion amount.

A clutch cover assembly according to a second invention relates to the clutch cover assembly of the first invention, and wherein the abrasion amount detecting mechanism further includes a cover side detecting member that is supported by the clutch cover and has a plurality of first meshing portions. The mobile detecting member is moved together with the pressure plate and has a second meshing portion allowed to be meshed with the plural first meshing portions. The second meshing portion is configured to be unmeshed from the first meshing portions when the abrasion amount of the friction member reaches the predetermined amount.

Here, the cover side detecting member is supported by the clutch cover, and the second meshing portion of the mobile detecting member is meshed with the first meshing portions formed in the cover side detecting member. When the pressure plate is then moved due to the abrasion of the friction member, the mobile detecting member is also moved in response to the movement. When the abrasion amount reaches the predetermined amount, the mobile detecting member and the cover side detecting member are unmeshed, and the both detecting members are meshed at another meshing position.

As described above, the mobile detecting member and the cover side detecting member are herein constantly meshed. Therefore, the both detecting members are less easily moved due to vibration. Therefore, the abrasion amount detecting mechanism is stabilized in its actuation and accurate abrasion compensation can be executed.

A clutch cover assembly according to a third invention relates to the clutch cover assembly of the second invention, and wherein the abrasion amount detecting mechanism further includes a first urging member that urges the mobile detecting member in an aligned direction of the plural first meshing portions and is configured to move the mobile detecting member to the second meshing position when the both meshing portions are unmeshed in the first meshing position.

As described above, the mobile detecting member is unmeshed from the cover side detecting member when the friction member is abraded at the predetermined amount. Here, the mobile detecting member is urged in the moving direction by the first urging member. Therefore, when being unmeshed therefrom, the mobile detecting member is smoothly moved to the next meshing position by the urging force of the first urging member.

A clutch cover assembly according to a fourth invention relates to the clutch cover assembly of the third invention, and wherein the abrasion tracking mechanism includes a plurality of fulcrum rings, slide portions and a second urging member. The plural fulcrum rings are respectively supported by the pressure plate in an axially movable state and are pressed towards the pressure plate by the pressure member. The slide portions are formed in the pressure plate and the respective plural fulcrum rings and slide in contact with each other. The second urging member rotates the plural fulcrum rings relatively to the pressure plate by urging the plural fulcrum rings in a circumferential direction. The slide portions are formed by slopes slanted along the circumferential direction. Further, the second urging member moves the plural fulcrum rings in a direction away from the pressure plate by rotating the plural fulcrum rings in accordance with the displacement of the mobile detecting member.

Here, the plural fulcrum rings are rotated relatively to the pressure plate by the second urging member by the amount corresponding to the displacement of the mobile detecting member, i.e., the abrasion amount of the friction member. The fulcrum rings and the pressure plate make contact with each other at the slide portions formed by the slopes. Therefore, the fulcrum rings are moved to a side away from the pressure plate when rotated with respect to the pressure plate. Accordingly, even when the friction member is abraded, the position where the fulcrum rings support the pressure member is not changed from that in the initial posture. Therefore, a pressure load characteristic, and further, a release load characteristic can be kept in their initial states.

A clutch cover assembly according to a fifth invention relates to the clutch cover assembly of the fourth invention, and wherein the abrasion amount detecting mechanism further includes a third urging member for causing the both meshing portions to be pressed in contact with each other.

Here, when a release operation is executed for the clutch, the pressure member is separated away from the fulcrum rings. In such condition, the mobile detecting member is axially movable together with the fulcrum rings and the pressure plate. Therefore, there are chances that the mobile detecting member is axially moved due to vibration and is unmeshed from the cover side detecting member.

In view of the above, in the clutch cover assembly according to the fifth invention, the third urging member causes the meshing portion of the mobile detecting member and that of the cover side detecting member to be pressed in contact with each other in order to prevent the both detecting members from being unmeshed.

A clutch cover assembly according to a sixth invention relates to the clutch cover assembly of the fifth invention, and wherein the mobile detecting member has a slope on an axial end side thereof and the slope has a gradient along the slope of the pressure plate and makes contact with the slope of the pressure plate. Further, the first urging member causes the second meshing portion to be meshed with the first meshing portions by moving the slope of the mobile detecting member along the slope of the pressure plate.

Advantageous Effects of Invention

According to the present invention as described above, in the abrasion amount detecting mechanism, the mobile detecting member is constantly meshed in a meshing position. The member for detecting the abrasion amount is not displaced due to vibration. Therefore, the abrasion amount detecting mechanism is stabilized in its actuation and accurate abrasion compensation can be constantly executed.

DETAILED DESCRIPTION OF THE PREFERRED EMBODIMENTS

Entire Structure

Figure 1:
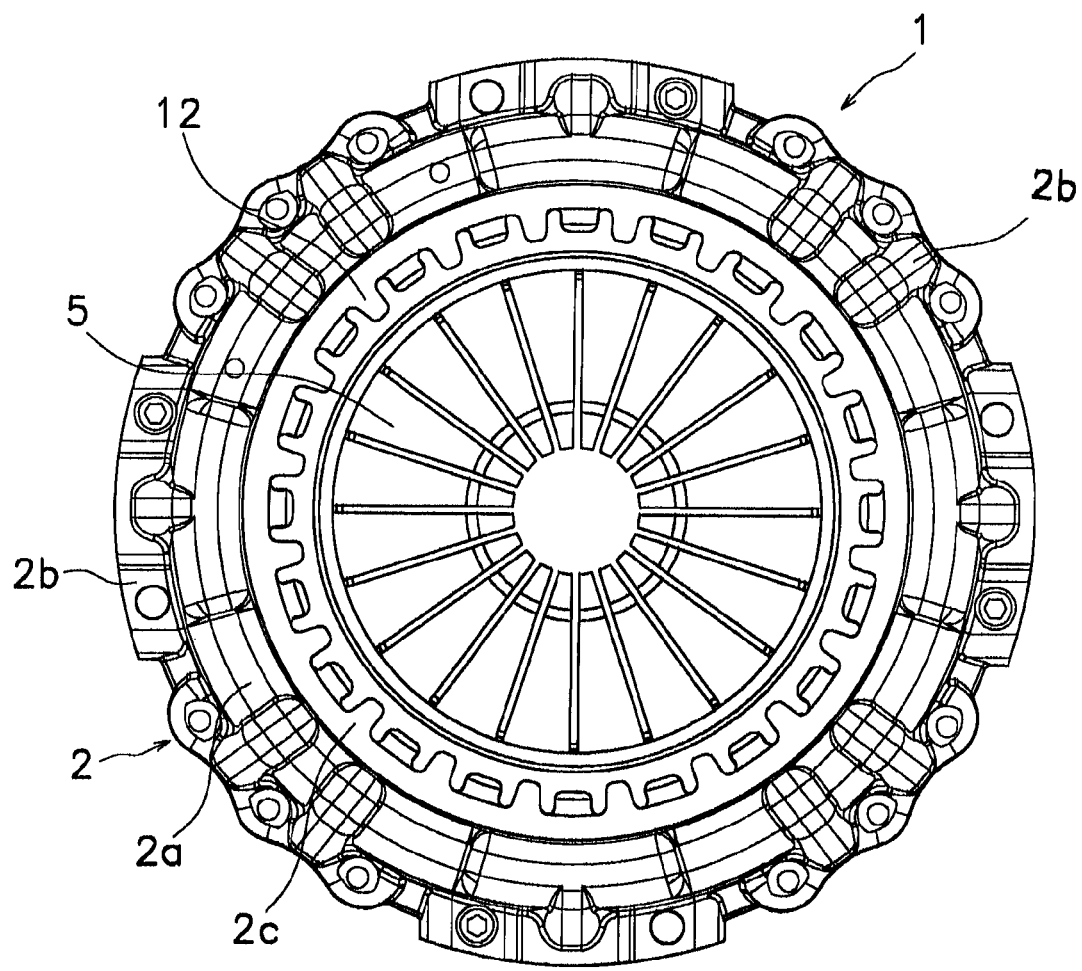
FIG. 1 is a front view of a clutch cover assembly according to an exemplary embodiment of the present invention.
Figure 2:
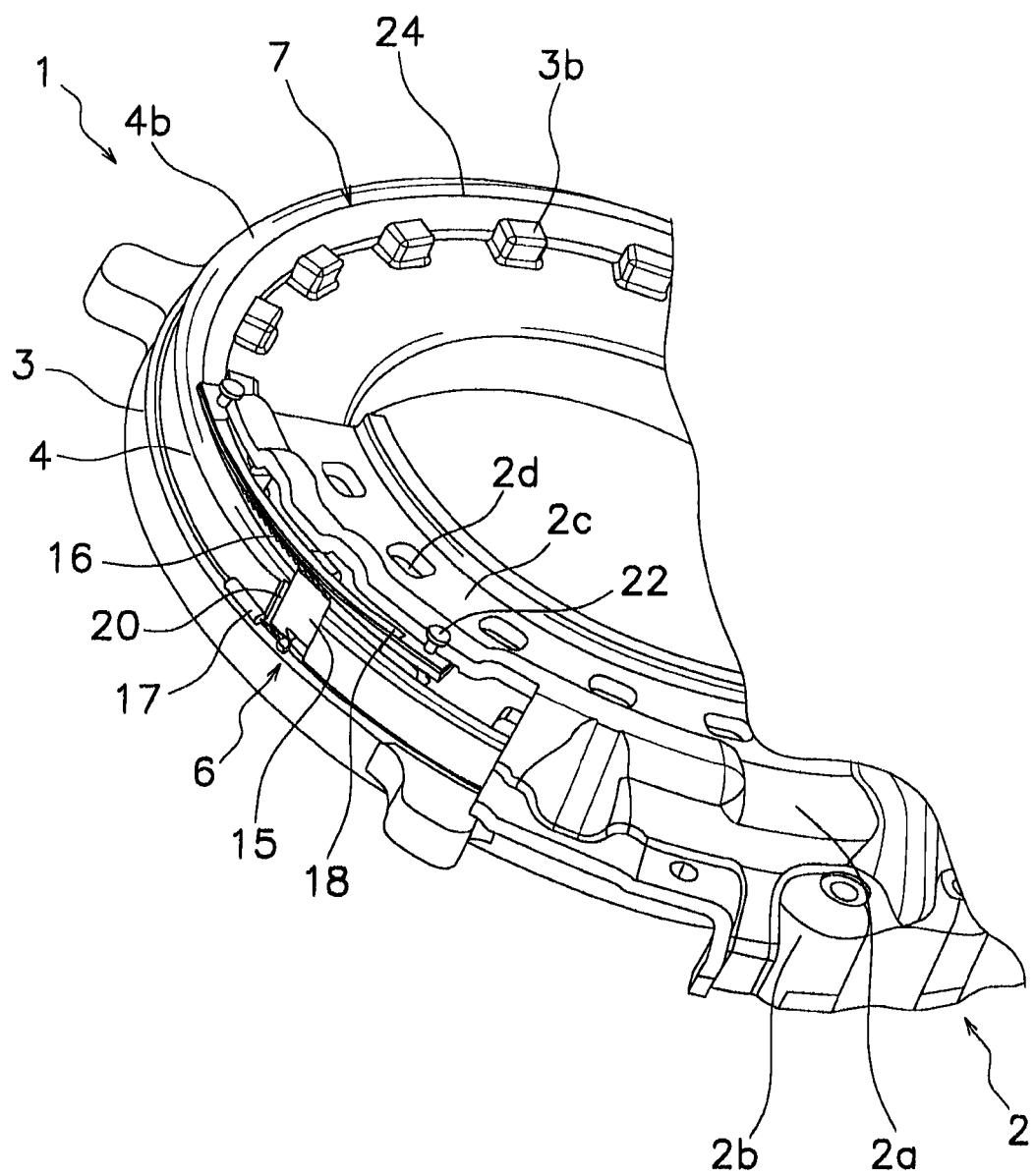
FIG. 2 is a partial exploded perspective view of the clutch cover assembly.

FIG. 1 illustrates a front view of a clutch cover assembly 1 according to an exemplary embodiment of the present invention. On the other hand, FIG. 2 illustrates an external perspective view of the clutch cover assembly 1 in which a part thereof is cut in a cross-section and some members are omitted. The clutch cover assembly 1 is a device for pressing a friction member of the clutch disc assembly onto a flywheel of an engine in a clutch-on (power transmission) state and for releasing the pressing in a clutch-off (power transmission blocking) state. It should be noted that the flywheel and the clutch disc assembly are herein omitted.

The clutch cover assembly 1 mainly includes a clutch cover 2, a pressure plate 3, a plurality of fulcrum rings 4, a diaphragm spring 5, abrasion amount detecting mechanisms 6, and an abrasion tracking mechanism 7 including the plural fulcrum rings 4.

[Clutch Cover]

The clutch cover 2 is a roughly saucer-shaped plate member and the outer peripheral part thereof is fixed to the flywheel by, for instance, bolts. The clutch cover 2 has an annular clutch cover main body 2a, a disc-shaped portion 2b disposed on the outer peripheral side and a flat portion 2c disposed on the inner peripheral side. The disc-shaped portion 2b is formed on the outer peripheral side of the clutch cover main body 2a and is fixed to the outer peripheral part of the flywheel. The flat portion 2c is a flat portion extended radially inwards from the inner peripheral part of the clutch cover main body 2a. A plurality of holes 2d are formed in the flat portion 2c while axially penetrating therethrough.

[Pressure Plate]

The pressure plate 3 is an annular member that is disposed inside the clutch cover main body 2a of the clutch cover 2. A friction surface, sliding in contact with the friction member of the clutch disc assembly, is formed on the flywheel side (lower side in FIG. 2) lateral surface of the pressure plate 3. Further, the pressure plate 3 is coupled to the clutch cover 2 by a plurality of strap plates (not illustrated in the figures), while being axially movable with respect to the clutch cover 2 but being non-rotatable relatively to the clutch cover 2. It should be noted that in a clutch coupled state, the strap plates are axially deflected and the pressure plate 3 is urged to a side away from the flywheel by the deflection (restoring force) of the strap plates.

Figure 3:
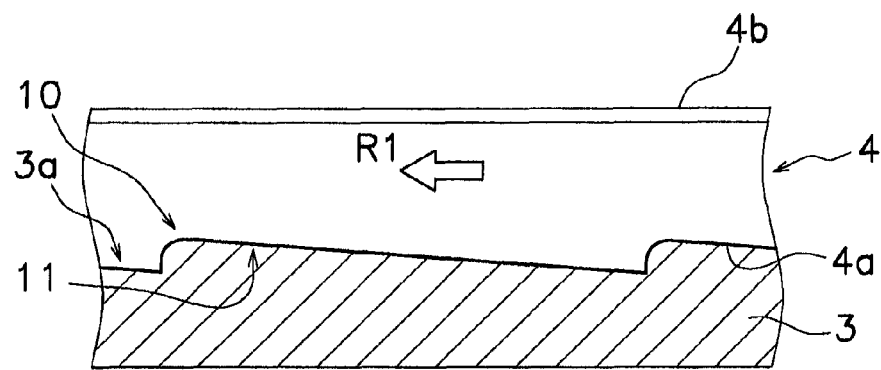
FIG. 3 is a partial enlarged view of a pressure plate and a fulcrum ring.

Further, as illustrated in FIG. 3, an annular groove 3a is formed on the outer peripheral part of the transmission side (upper side in FIG. 2) surface of the pressure plate 3. Slide portions 10 are formed on the bottom surface of the annular groove 3a at a plurality of positions in the circumferential direction. Each slide portion 10 has a slope slanted for gradually increasing the height thereof in the circumferential direction (R1 direction in FIG. 3). Further, a plurality of protrusions 3b (see FIG. 2) are formed on the inner peripheral side of the annular groove 3a. The plural protrusions 3b are axially protruded, while being circumferentially aligned at predetermined intervals.

[Fulcrum Rings]

Each of the plural fulcrum rings 4 is a circular-arc member, i.e., one of the members formed by circumferentially dividing an annular member, and as illustrated in FIGS. 2 and 3, its first end 4a side (flywheel side) in the axial direction is inserted into the annular groove 3a of the pressure plate 3. On the other hand, a second end 4b side (transmission side) of each fulcrum ring 4 in the axial direction is protruded from the annular groove 3a. As is obvious from FIG. 3, slide portions 11 are formed on the first ends 4a of the fulcrum rings 4 at a plurality of positions in the circumferential direction. The slide portion 11 makes contact with the slope of the slide portion 10 formed on the bottom surface of the annular groove 3a of the pressure plate 3, and has a slope slanted for gradually reducing the height thereof in the circumferential direction (R1 direction in FIG. 3).

[Diaphragm Spring]

Figure 4:
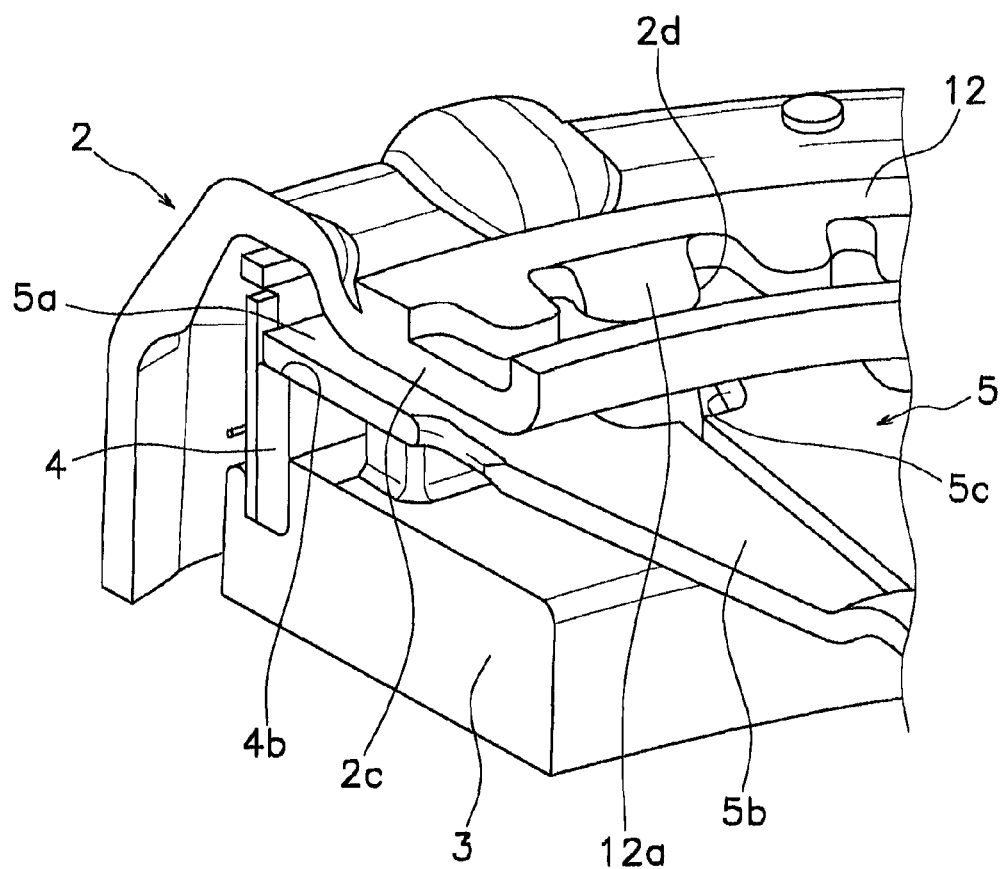
FIG. 4 is a partial cross-sectional perspective view of a support structure of a diaphragm spring.

The diaphragm spring 5 is a disc-shaped member disposed between the pressure plate 3 and the clutch cover 2, and is partially illustrated in FIG. 4. The diaphragm spring 5 is formed by an annular elastic portion 5a and a plurality of lever portions 5b extended radially inwards from the inner peripheral part of the annular elastic portion 5a. The outer peripheral end of the annular elastic portion 5a is supported by the second ends 4b of the fulcrum rings 4. Further, slits are formed between adjacent lever portions 5b of the diaphragm spring 5, and oval-shaped holes 5c are formed in the outer peripheral parts of the slits.

It should be noted that a push-type release device (not illustrated in the figures) makes contact with the tips of the lever portions 5b of the diaphragm spring 5. The release device is a device configured to axially move the tips of the lever portions 5b of the diaphragm spring 5 in order to release the urging force acting on the pressure plate 3.

Further, as illustrated in FIG. 4, the diaphragm spring 5 is supported with respect to the clutch cover 2 by a support member 12. Regarding this, a more detailed explanation will be made. The support member 12 is a ring-shaped plate member disposed on the transmission side surface of the flat portion 2c of the clutch cover 2. A plurality of support protrusions 12a are formed on the inner peripheral part of the support member 12 while being extended therefrom radially inwards. The plural support protrusions 12a are bent towards the pressure plate 3 and the bent portions thereof penetrate through the plural through holes 2d formed in the flat portion 2c of the clutch cover 2. The bent portions, penetrating through the through holes 2d, further penetrate through the oval-shaped holes 5c of the diaphragm spring 5. Further, the tips of the support protrusions 12a are bent to the outer peripheral side, and thus, support the diaphragm spring 5 with respect to the clutch cover 2.

[Abrasion Amount Detecting Mechanisms]

Figure 5:
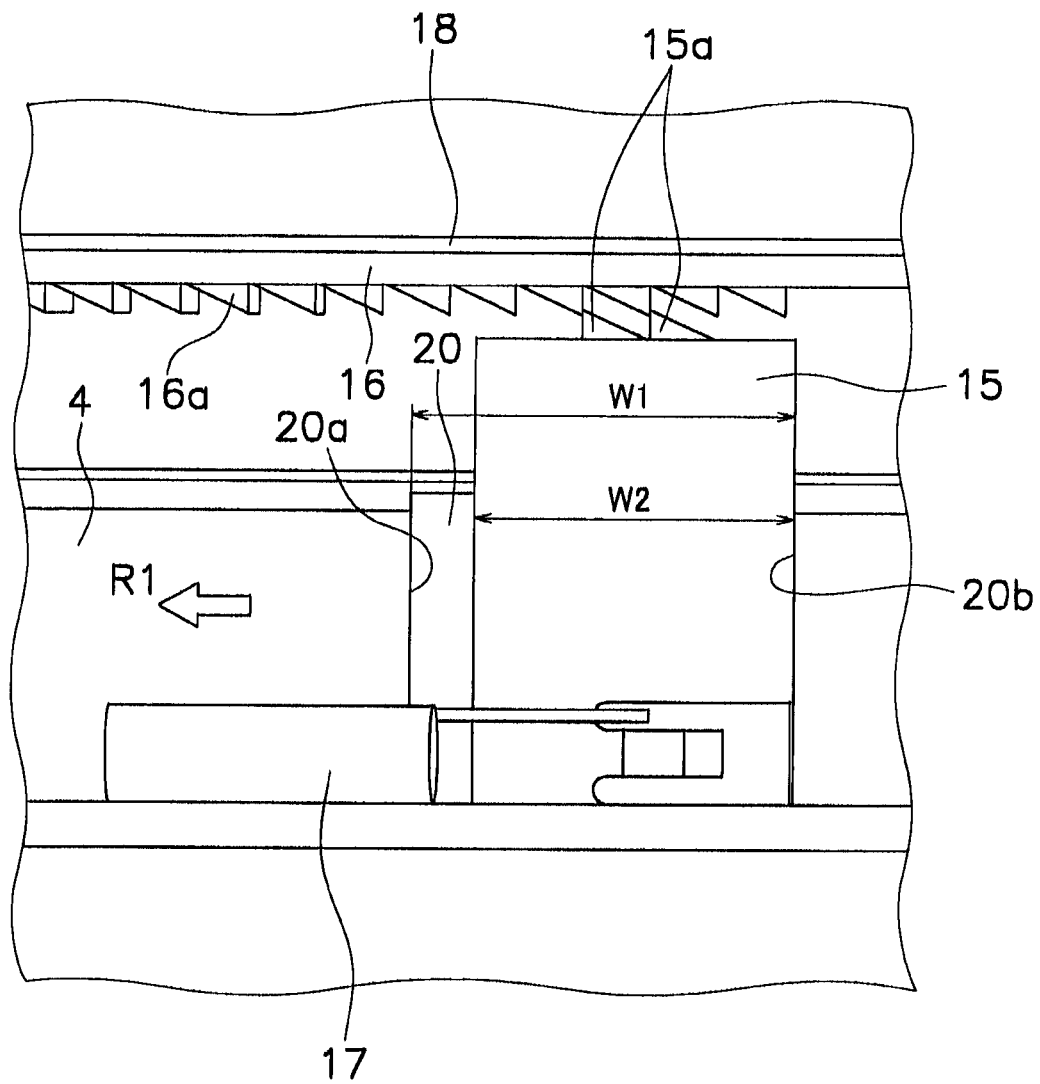
FIG. 5 is a diagram illustrating a structure of an abrasion amount detecting mechanism.
Figure 6:
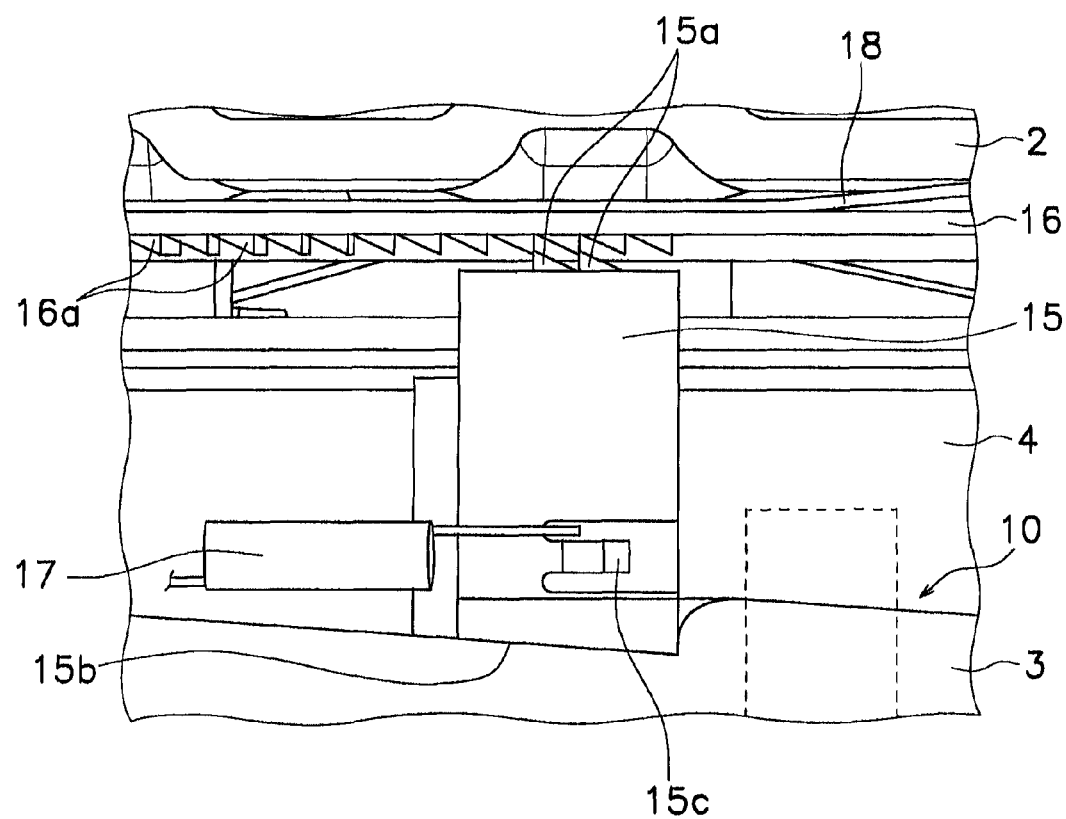
FIG. 6 is a diagram illustrating a structure of the abrasion amount detecting mechanism.

As illustrated in FIGS. 2, 5 and 6, the abrasion amount detecting mechanisms 6 are disposed at a plurality of positions on the outer peripheral parts of the fulcrum rings 4. The abrasion amount detecting mechanism 6 is a device detecting that the abrasion amount of the friction member forming the clutch disc assembly has reached a predetermined amount, and includes a mobile detecting member 15, a cover side detecting member 16, a first coil spring 17 and a plate spring 18.

The mobile detecting member 15 is a roughly rectangular plate that is disposed on a recess 20 formed on the outer peripheral part of the fulcrum ring 4. The recess 20 has a width W1 in the circumferential direction. The width W1 of the recess 20 is greater than a width W2 of the mobile detecting member 15 in the circumferential direction. Therefore, the mobile detecting member 15 is movable within a range of (W1-W2) in the circumferential direction. Two teeth (second meshing portions) 15a, which axially protrude, are formed on a transmission side (upper side in FIG. 5) end surface of the mobile detecting member 15. The opposite side end surface thereof is formed as a slope 15b. The slope 15b has the same gradient as the slope of the slide portion 10 formed in the annular groove 3a of the pressure plate 3 (but the direction thereof is opposite thereto) and the both slopes make contact with each other.

The cover side detecting member 16 is a strap-shaped circular-arc plate that is supported with respect to a pressure plate side surface of the clutch cover 2 through rivets 22. The pressure plate side surface of the cover side detecting member 16 is opposed to the surface, on which the teeth 15a are formed, of the mobile detecting member 15, and has a plurality of teeth 16a (first meshing portions) formed thereon. The plural teeth 16a of the cover side detecting member 16 are respectively allowed to be meshed with the teeth 15a of the mobile detecting member 15.

The first coil spring 17 is a member for urging the mobile detecting member 15 in the circumferential direction. One end thereof is locked with a cut-and-raised portion 15*c* formed in the mobile detecting member 15 while the other end thereof is locked with the pressure plate 3 (the locking portion locked with the pressure plate 3 is omitted). The mobile detecting member 15 is moved within the recess 20 of the fulcrum ring 4 in the R1 direction in FIG. 5 by the first coil spring 17 when being unmeshed from the cover side detecting member 16.

The plate spring 18 is disposed between the cover side detecting member 16 and the clutch cover 2, while being supported together with the cover side detecting member 16 with respect to the clutch cover 2 through the rivets 22. The plate spring 18 has a length and a width roughly the same as those of the cover side detecting member 16. As is obvious from FIG. 6, the both longitudinal end portions of the plate spring 18 make contact with the surface of the clutch cover 2. However, the both end portions are separated away from the cover side detecting member 16, while the remaining portion other than the both end portions is separated away from the clutch cover 2 by a predetermined distance and makes contact with the cover side detecting member 16. Therefore, when the mobile detecting member 15 is moved towards the transmission and the plate spring 18 is elastically deformed, its restoring force (urging force) causes the cover side detecting member 16 and the mobile detecting member 15 (in more detail, the teeth 15*a* and 16*a* of the both members) to be pressed in contact with each other.

[Abrasion Tracking Mechanism]

The abrasion tracking mechanism 7 is a mechanism for keeping the posture of the diaphragm spring 5 at its initial posture by causing the diaphragm spring 5 to track the abrasion amount of the friction member, i.e., the displacement of the mobile detecting member 15. In addition to the plural fulcrum rings 4, the abrasion tracking mechanism 7 includes the slide portions 10 and 11 respectively formed on the aforementioned pressure plate 3 and fulcrum rings 4 and a plurality of second coil springs 24.

The plural second coil springs 24 serve to rotate the fulcrum rings 4 in the circumferential direction and are disposed between the fulcrum rings 4 and the plural protrusions 3*b* formed on the pressure plate 3 as illustrated in FIG. 2. Each second coil spring 24 is locked with the fulcrum ring 4 at one end thereof, while being locked with the pressure plate 3 at the other end thereof.

With the structure as described above, when the mobile meshing member 15 and the cover side detecting member 16 are once unmeshed and the mobile meshing member 15 is moved to the next meshing position, the fulcrum ring 4 is rotatable by the displacement (W1-W2 in FIG. 5) of the mobile detecting member 15. When the fulcrum ring 4 is then rotated with respect to the pressure plate 3, the fulcrum ring 4 is supposed to be axially moved to a side away from the pressure plate 3 because the both members make contact with each other at the slopes of the slide portions 10 and 11.

[Abrasion Amount Detecting Action and Abrasion Tracking Action]

In the clutch-on (coupled) state, the pressure load of the diaphragm spring 5 acts on the pressure plate 3 through the fulcrum rings 4. Accordingly, the friction member of the clutch disc assembly is interposed and held between the pressure plate 3 and the flywheel. As illustrated in FIGS. 5 and 6, the teeth 15*a* of the mobile detecting member 15 are herein meshed with the teeth 16*a* of the cover side detecting member 16.

Figure 7:
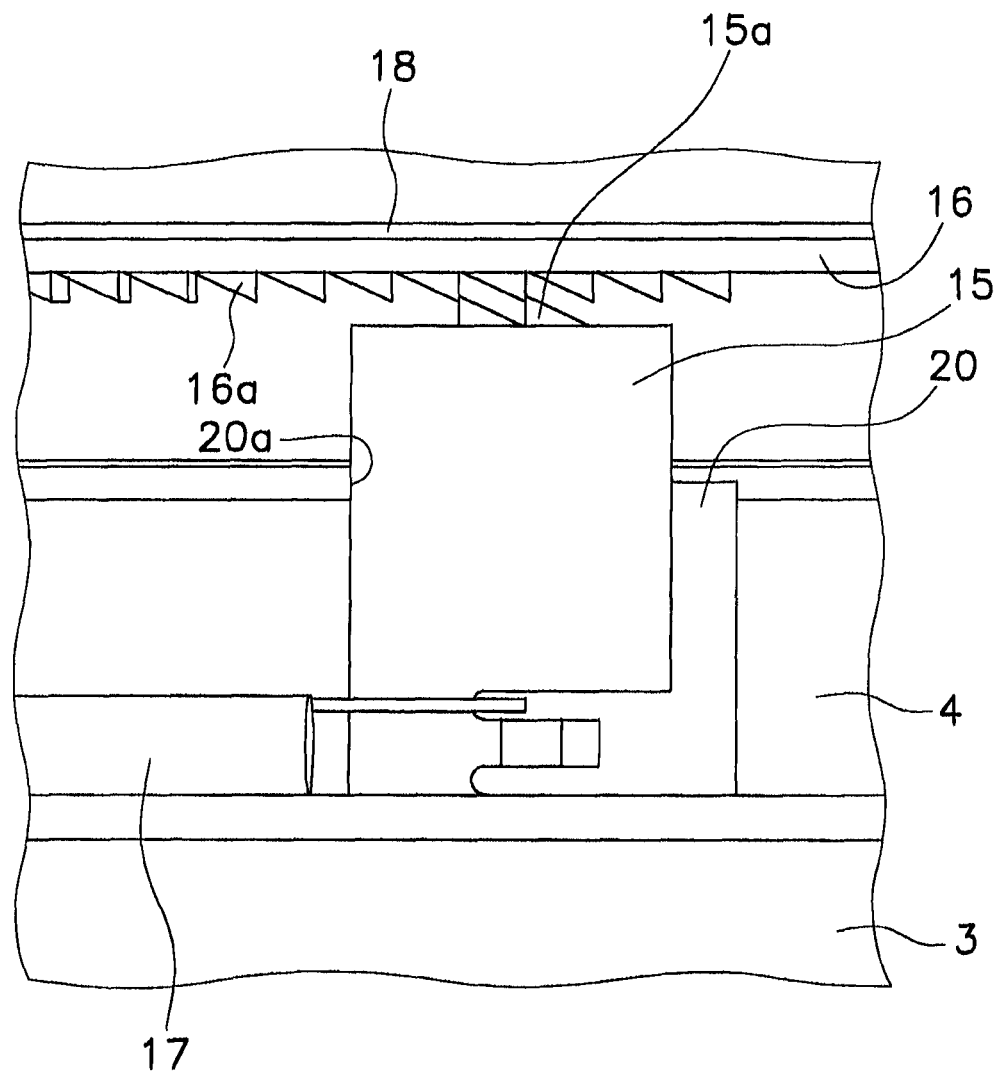
FIG. 7 is a diagram for explaining actions of the abrasion amount detecting mechanism and an abrasion tracking mechanism.

When the friction member is abraded, the thickness of the friction member is reduced. Therefore, the pressure plate 3 is supposed to be moved towards the flywheel (lower side in FIGS. 5 and 6). Further, the mobile detecting member 15 is supported by the pressure plate 3, and is therefore similarly supposed to be moved towards the flywheel in accordance with the movement of the pressure plate 3. When the friction member is then abraded at a predetermined amount, the teeth 15*a* of the mobile detecting member 15 and the teeth 16*a* of the cover side detecting member 16 are unmeshed. When the teeth 15*a* and 16*a* of the both members 15 and 16 are thus unmeshed, the mobile detecting member 15 is moved in the R1 direction in FIG. 5 by the urging force of the first coil spring 17. The mobile detecting member 15 is herein disposed in the recess 20 of the fulcrum ring 4, and is therefore stopped at a point of time when its lateral end surface collides against a lateral end surface 20*a* on one side of the recess 20, i.e., after being moved by (W1-W2). The condition is illustrated in FIG. 7.

It should be noted that the flywheel side end surface of the mobile detecting member 15 is slanted and the slope 15*b* is moved in the R1 direction along the slide portion 10 of the pressure plate 3. Therefore, the mobile detecting member 15 is also moved towards the transmission side (upwards in FIGS. 5 and 6) in conjunction with the movement in the R1 direction. Due to the movement, the mobile detecting member 15 is supposed to be meshed again with the cover side detecting member 16. In other words, the mobile detecting member 15 and the cover side detecting member 16 are once unmeshed due to the abrasion of the friction member, but are moved by the urging force of the first coil spring 17 and meshed at adjacent teeth. More specifically, when the friction member is abraded at a predetermined amount, the meshing between the mobile detecting member 15 and the cover side detecting member 16 is displaced by 1 pitch of the plural teeth 16*a* of the cover side detecting member 16. 1 pitch corresponds to a difference (W1-W2) between the width W1 of the recess 20 of the fulcrum ring 4 and the width W2 of the mobile detecting member 15.

Figure 8:
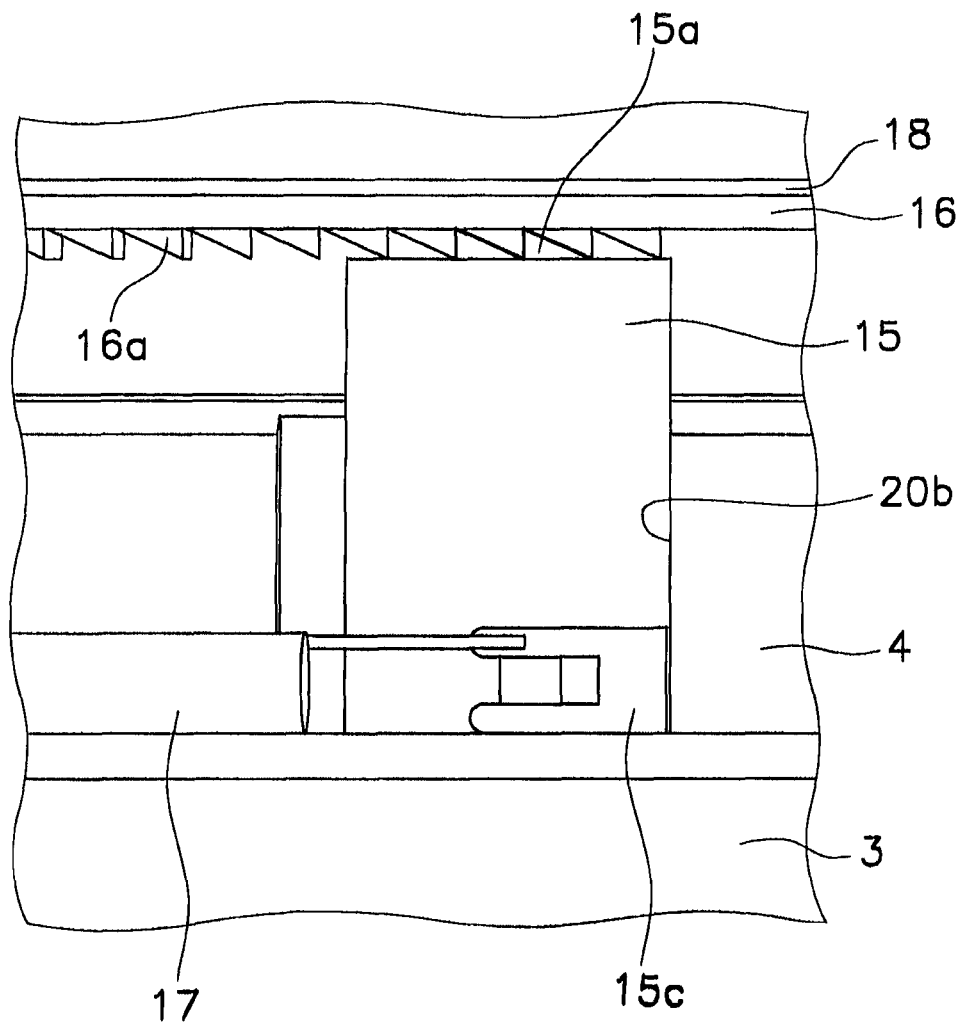
FIG. 8 is a diagram for explaining actions of the abrasion amount detecting mechanism and the abrasion tracking mechanism.

Next, when a release operation is performed after the mobile detecting member 15 is moved as described above, the pressure of the diaphragm spring 5 onto the fulcrum ring 4 is released. The fulcrum ring 4 is herein urged by the second coil spring 24 in the R1 direction. Therefore, the fulcrum ring 4 is rotated with respect to the pressure plate 3 in the R1 direction when the pressure load onto the fulcrum ring 4 is released. As illustrated in FIG. 8, the rotation of the fulcrum ring 4 is stopped when an end surface 20*b* of the recess 20 of the fulcrum ring 4 makes contact with a lateral end surface of the mobile detecting member 15. Thus, the fulcrum ring 4 is rotated by 1 pitch, i.e., by (W1-W2) and is then stopped.

Further, the fulcrum ring 4 and the pressure plate 3 make contact with each other at the slide portions 10 and 11 (slopes) thereof. Therefore, the fulcrum ring 4 is moved in a direction away from the pressure plate 3 when rotated at 1 pitch as described above. In other words, the fulcrum ring 4 is moved towards the transmission by the abrasion amount of the friction member (the displacement of the mobile detecting member 15). With the movement, the fulcrum ring 4 is supposed to be returned to its initial position corresponding to a pre-abraded state of the friction member.

It should be noted that in clutch releasing, the pressure load onto the fulcrum ring 4 is released as described above, and the fulcrum ring 4, the pressure plate 3 and the mobile detecting member 15 are allowed to be axially moved. When the mobile detecting member 15 is herein axially moved due to vibration, there are chances that the teeth 15*a* of the mobile detecting member 15 and the teeth 16*a* of the cover side detecting member 16 are unmeshed.

In the present exemplary embodiment, however, the cover side detecting member 16 is urged towards the mobile detecting member 15 by the plate spring 18. Therefore, as illustrated in FIG. 8, the both members are supposed to be rigidly meshed and can be inhibited from being unmeshed due to vibration.

When the clutch release operation is then finished, the diaphragm spring 5 presses the fulcrum ring 4. The fulcrum ring 4 is herein returned to its initial positions by the aforementioned abrasion tracking action. Therefore, the posture of the diaphragm spring 5 will be also its initial state. Consequently, the pressure load characteristic, and further, the release operation load will be also similar to their initial states.

[Features]

(1) In the abrasion amount detecting mechanism 6, the teeth 15*a* of the mobile detecting member 15 and the teeth 16*a* of the cover side detecting member 16 are constantly meshed. Therefore, it is possible to inhibit detection results of the abrasion amount from varying due to vibration. Therefore, the abrasion amount detecting mechanism 6 is stabilized in its actuation and accurate abrasion compensation can be executed.

(2) After the abrasion amount of the friction member is detected, the mobile detecting member 15 and the cover side detecting member 16 are quickly shifted to the next meshed state. Therefore, similarly to the above, the abrasion amount detecting mechanism is stabilized in its actuation.

(3) The plate spring 18 is provided for causing the teeth 15*a* of the mobile detecting member 15 and the teeth 16*a* of the cover side detecting member 16 to be pressed in contacted with each other in clutch releasing. Therefore, the mobile detecting member 15 and the cover side detecting member 16 can be inhibited from being unmeshed due to vibration in clutch releasing.

Other Exemplary Embodiments

The present invention is not limited to the aforementioned exemplary embodiment, and a variety of changes or modifications can be made without departing from the scope of the present invention.

(a) The shape and etc. of the members forming the abrasion amount detecting mechanism are not limited to those in the aforementioned embodiment. Any structure can be applied as long as the structure has a plurality of meshing positions and one selected from the meshing positions is changed in accordance with the abrasion amount of the friction member.

(b) The structure of the abrasion tracking mechanism can be arbitrarily selected as long as it works for keeping the initial posture of the diaphragm spring, and is not limited to the aforementioned exemplary embodiment.

INDUSTRIAL APPLICABILITY

According to the present invention, in the abrasion amount detecting mechanism, the mobile detecting member is constantly meshed in a meshing position. Therefore, a member for detecting the abrasion amount is not displaced due to vibration. The abrasion amount detecting mechanism is thereby stabilized in its actuation and accurate abrasion compensation can be constantly executed.

The invention claimed is:

1. A clutch cover assembly for applying and releasing pressing of a friction member of a clutch disc assembly onto a flywheel of an engine, the clutch cover assembly comprising:
    a clutch cover being fixed to the flywheel;
    a pressure plate being configured to press the friction member onto the flywheel, the pressure plate being coupled to the clutch cover in a relatively non-rotatable state;
    a pressure member configured to press the pressure plate towards the flywheel, the pressure member being supported by the clutch cover;
    an abrasion amount detecting mechanism having first and second meshing positions, the abrasion amount detecting mechanism including a mobile detecting member having a second meshing portion and a cover side detecting member having a plurality of first meshing portions, the second meshing portion engaging the plurality of first meshing portions in the first and second meshing positions, the mobile detecting member being configured to release meshing from the first meshing position and move to the second meshing position when an abrasion amount of the friction member reaches a predetermined amount; and
    an abrasion tracking mechanism for moving the pressure member to an initial posture side thereof in accordance with a displacement of the mobile detecting member.

2. The clutch cover assembly recited in claim 1, wherein the cover side detecting member is supported by the clutch cover,
    the mobile detecting member is configured to be moved together with the pressure plate and to make the second meshing portion to be meshed with the plurality of first meshing portions, and
    the second meshing portion is configured to be unmeshed from the first meshing portions when the abrasion amount of the friction member reaches the predetermined amount.

3. The clutch cover assembly recited in claim 2, wherein the abrasion amount detecting mechanism further includes a first urging member being configured to urge the mobile detecting member in a circumferential direction of the plural first meshing portions, and
    the first urging member is configured to move the mobile detecting member to the second meshing position when the first and second meshing portions are unmeshed in the first meshing position.

4. The clutch cover assembly recited in claim 3, wherein the abrasion tracking mechanism includes
    a plurality of fulcrum rings supported by the pressure plate in an axially movable state, where the fulcrum rings pressed towards the pressure plate by the pressure member,
    slide portions formed in the pressure plate and the plurality of fulcrum rings, where the slide portions are configured to slide in contact with each other, and
    a second urging member being configured to rotate the plurality of fulcrum rings in respect to the pressure plate by urging the plurality of fulcrum rings in a circumferential direction,
    the slide portions are formed by slopes slanted along the circumferential direction, and
    the second urging member is configured to move the plurality of fulcrum rings in a direction away from the pressure plate by rotating the plurality of fulcrum rings in accordance with the displacement of the mobile detecting member.

5. The clutch cover assembly recited in claim 4, wherein the abrasion amount detecting mechanism further includes
   a third urging member being configured to cause the first and second meshing portions to be pressed in contact with each other.

6. The clutch cover assembly recited in claim 5, wherein the mobile detecting member has a slope on an axial end side thereof,
   the slope of the mobile detecting member has a gradient along the slope of the pressure plate,
   the slope of the mobile detecting member is configured to make contact with the slope of the pressure plate, and
   the first urging member is configured to cause the second meshing portion to be meshed with the first meshing portions by moving the slope of the mobile detecting member along the slope of the pressure plate.

\* \* \* \* \*